(No Model.)
A. M. SHURTLEFF.
TESTING DEVICE FOR PNEUMATIC TIRE VALVES.
No. 555,344.　　　　　　　　　Patented Feb. 25, 1896.
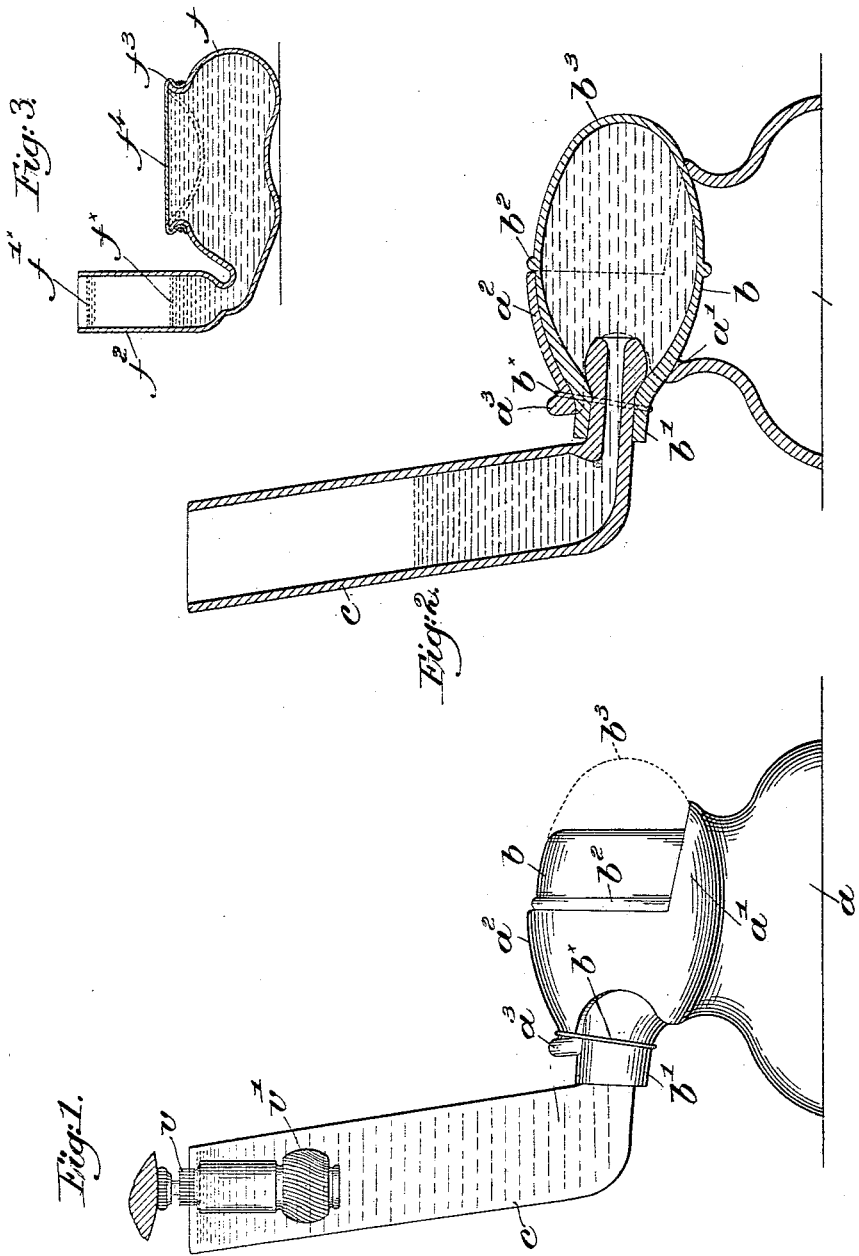
Witnesses.
Fred S. Greenleaf.
Thomas J. Drummond.
Inventor.
Asahel M. Shurtleff.
by Crosby & Gregory
Attys.

UNITED STATES PATENT OFFICE.

ASAHEL M. SHURTLEFF, OF BOSTON, MASSACHUSETTS, ASSIGNOR TO CODMAN & SHURTLEFF, OF SAME PLACE.

TESTING DEVICE FOR PNEUMATIC-TIRE VALVES.

SPECIFICATION forming part of Letters Patent No. 555,344, dated February 25, 1896.

Application filed April 27, 1895. Serial No. 547,332. (No model.)

*To all whom it may concern:*

Be it known that I, ASAHEL M. SHURTLEFF, of Boston, county of Suffolk, State of Massachusetts, have invented an Improvement in Testing Devices for Pneumatic-Tire Valves, of which the following description, in connection with the accompanying drawings, is a specification, like letters on the drawings representing like parts.

The pneumatic tires which have come into such very extensive use for bicycles and other vehicles must from time to time have a fresh quantity of air forced thereinto to maintain the proper distension.

A valve is attached to the tire to connect it with the air-pump or other source of compressed air, and in order to test the valve as to the tightness of closure at any time, and especially after disconnecting it from the air-supply, it is usually immersed in a vessel of water. If the valve leaks the escaping air will disclose itself in bubbles rising in the water, and this water test is very efficient. The most extended application of such a test, however, is for the valves of the pneumatic tires of bicycles, and owing to the location of the valve on the inner circumference of the wheel-rim between two adjacent spokes it is very awkward and inconvenient to make the test as now practiced.

This invention has for its object the production of a simple and convenient device for making such tests, means being provided for so magnifying the size of the valve and the escaping air-bubbles, if there be any, that the test can be much more delicately and accurately applied than is now possible.

In accordance therewith my invention consists in a testing device for pneumatic-tire valves, of a liquid-containing receptacle, a stem therefor to receive the valve to be tested, and means to vary the level of the liquid in the stem to submerge the end of the valve, substantially as will be described.

Other features of my invention will be hereinafter described and particularly pointed out in the claims.

Figure 1, in side elevation, represents one form of testing device embodying my invention in position to test a valve and showing the latter as magnified in part. Fig. 2 is a longitudinal sectional view of the testing device in normal condition. Fig. 3 is a longitudinal section of a modification.

Referring now to Figs. 1 and 2, a base or stand $a$ of metal or other suitable material has a seat $a'$ and an arched top $a^2$ to receive therein a bulb $b$, of preferably rubber or other suitable elastic material, resting on the seat $a'$ and having its neck $b'$ extended out through the end of the top, to which it may be secured by a loop $b^\times$ of wire or cord passed around the neck of the bulb and back of a lip $a^3$ on the top. Forward longitudinal movement of the bulb is prevented by the shape of the arched top $a^2$ and by the annular rib $b^2$. Into the neck $b'$ of the receptacle is inserted the bent lower end of a preferably cylindrical stem or tube $c$, wholly or partly of glass, upturned some distance above the top of the stand and of such diameter as will readily admit a tire-valve $v$ into its upper end. The receptacle $b$ is filled with a transparent fluid, preferably water, for many obvious reasons, the water normally partially filling the stem $c$, as shown in Fig. 2.

When a valve is to be tested the wheel is turned until the valve is in a depending position, and the base $a$ is grasped in the hand of the operator, with his thumb against the end or tip $b^3$ of the bulb, the whole device being raised until the valve $v$ enters the mouth of the stem $c$, as shown in Fig. 1. Pressure of the thumb against the tip of the bulb presses it in, as in full lines, Fig. 1, and forces the water up in the stem until the nut $v'$ and any adjacent joints on the valve are entirely submerged, and any escaping air will be at once detected by the bubbles rising through the water. The smallest leak may thus be detected, and the accuracy of the test is enhanced by the magnifying action of the stem when filled with water, due to its substantially-cylindrical shape, this effect being very clearly shown in Fig. 1, wherein the portion of the valve immersed is much enlarged.

The stem $c$ is preferably inclined with reference to the receptacle and base, so that the spokes of the wheel will not interfere in any way with the application of the device when making a test.

When not in use the testing device may be placed upon a shelf or other convenient support, the stand $a$ forming a firm base therefor, and serving as a convenient handle when in use, so that no time is lost by the operator in constantly replenishing the receptacle with fluid, and the device is consequently always in condition.

For both cheapness and effectiveness it is preferable to make the stem $c$ of transparent glass.

In the modification shown in Fig. 3 the receptacle $f$, having a base $f'$, is made of glass, preferably, and integral with the upturned tubular stem $f^2$, the open top $f^3$ of the receptacle being closed by an elastic diaphragm $f^4$.

When the receptacle $f$ is filled with liquid, as shown, the level of the fluid in the stem $f^2$ will be at or near the point $f^\times$, but depression of the diaphragm $f^4$ into dotted-line position will elevate the liquid in the stem to about the level $f'^\times$, to surround the greater part of the valve.

I have found in practice that the magnifying effect of the stem on the submerged part of the valve is very advantageous, as the tire-valves are small and it is often difficult to detect a small leak by the means now in vogue.

My invention is not restricted to the precise construction of the device, as it will be obvious from the foregoing that various changes and modifications can be made without departing from the spirit and scope of my invention.

It is to be noted that in the forms of my invention herein illustrated, the fluid is displaced by hand-pressure upon the receptacle or container, thus doing away with the necessity of a mechanically-moved displacer.

I claim—

1. A device for testing pneumatic-tire valves for leakage, comprising a liquid-receptacle composed of a rigid portion and compressible member which is adapted to be manually moved to displace the liquid, and a transparent test-tube applied to such receptacle laterally and extending above it and adapted to receive the liquid displaced from the said receptacle and thereby permit of the submerging of the valve to be tested in sight in the liquid in the said test-tube, substantially as described.

2. The herein-described device for testing air-valves for leakage, comprising a rigid stand, a liquid-receptacle mounted in such stand and constructed as a manually compressible bulb to effect the displacement of the liquid therein, and a transparent test-tube connected and communicating with such liquid-receptacle and adapted to receive the liquid displaced therefrom, in which liquid in the test-tube the valve to be tested is submerged, substantially as described.

In testimony whereof I have signed my name to this specification in the presence of two subscribing witnesses.

ASAHEL M. SHURTLEFF.

Witnesses:
JOHN C. EDWARDS,
EMMA J. BENNETT.